(12) United States Patent  (10) Patent No.: US 12,475,169 B2
Koya et al.  (45) Date of Patent: Nov. 18, 2025

(54) EXTRACTION DEVICE, EXTRACTION METHOD, AND EXTRACTION PROGRAM

(71) Applicant: NTT, Inc., Tokyo (JP)

(72) Inventors: Hidetaka Koya, Musashino (JP); Akira Kataoka, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/718,333

(22) PCT Filed: Dec. 14, 2021

(86) PCT No.: PCT/JP2021/046123
§ 371 (c)(1),
(2) Date: Jun. 10, 2024

(87) PCT Pub. No.: WO2023/112168
PCT Pub. Date: Jun. 22, 2023

(65) Prior Publication Data
US 2025/0086233 A1  Mar. 13, 2025

(51) Int. Cl.
*G06F 7/00* (2006.01)
*G06F 16/17* (2019.01)
*G06F 16/9032* (2019.01)

(52) U.S. Cl.
CPC ...... *G06F 16/9032* (2019.01); *G06F 16/1734* (2019.01)

(58) Field of Classification Search
CPC .. G06F 16/9032; G06F 16/1734; G06F 9/544; G06F 9/4498

USPC ............... 707/613, 626, 648, 674, 769, 740, 707/999.107
See application file for complete search history.

(56) References Cited

U.S. PATENT DOCUMENTS

| 6,651,099 B1* | 11/2003 | Dietz ............... G06F 16/90344 709/224 |
| 2008/0071982 A1* | 3/2008 | Kanno ................ G06F 21/6218 711/112 |
| 2020/0034224 A1* | 1/2020 | Nagendra ............ G06F 11/004 |
| 2020/0104142 A1 | 4/2020 | Waga et al. |

FOREIGN PATENT DOCUMENTS

JP  2020-057362  4/2020

OTHER PUBLICATIONS

Koya et al., "Suggestion and Evaluation of Setting Method by End User for User Interface Extension," IEICE Technical Report, May 2019, ICM2019-4(2019-05):59-64, 14 pages (with English translation).
Rodrigues et al., "SSTS: A syntactic tool for pattern search on time series," Information Processing and Management, Jan. 2019, 56(1):61-76.

* cited by examiner

*Primary Examiner* — Md I Uddin
(74) *Attorney, Agent, or Firm* — Fish & Richardson P.C.

(57) ABSTRACT

An extraction device includes processing circuitry configured to create an operation pattern using a state of an operation result and an order of the state, acquire an operation log, and extract the operation pattern included in the acquired operation log.

7 Claims, 15 Drawing Sheets

REGULAR EXPRESSION OF LEFT 6 PATTERNS IS APPLIED TO SERIES ON LEFT SIDE OF D, AND {{A&B&C}} IS SATISFIED IF ANY ONE MATCHES

Fig. 11

(1)  B A C !B B !A A !C D (2)  THREE PATTERNS BELOW ARE EVALUATED FOR SERIES ON LEFT SIDE OF D, AND RESULTS ARE HELD

MATCHING RESULT OF Result_A = A(?!.*¥!A) (True or False)
MATCHING RESULT OF Result_B = B(?!.*¥!B) (True or False)
MATCHING RESULT OF Result_C = C(?!.*¥!C) (True or False)

(3)  RESULTS ARE REFLECTED IN LOGICAL FORMULA

→ EVALUATION RESULT ⇒ (Result_A)AND(Result_B)AND(Reuslt_C)

EXTRACTION DEVICE, EXTRACTION METHOD, AND EXTRACTION PROGRAM

CROSS-REFERENCE TO RELATED APPLICATIONS

This application is a National Stage application under 35 U.S.C. § 371 of International Application No. PCT/JP2021/046123, having an International Filing Date of Dec. 14, 2021. The disclosure of the prior application is considered part of the disclosure of this application, and is incorporated by reference in its entirety into this application.

TECHNICAL FIELD

The present invention relates to an extraction device, an extraction method, and an extraction program.

BACKGROUND ART

In recent years, a technique of performing task analysis or the like by utilizing a log of an operation (hereinafter referred to as an operation log) of a PC has attracted attention. For example, a large amount of operation logs are accumulated, and characteristic patterns such as repeated operations are mechanically discovered from the accumulated operation logs by offline processing such as data mining and utilized for task analysis.

Alternatively, there are cases in which, with respect to a pattern expressed and input by a user, whether or not there is a matching operation status in accumulated operation logs is determined offline, or whether or not a current operation status matches is determined online.

In addition, there is a technique of expressing only a state such as a URL, a title, and whether or not a specific UI is present in a system screen at the time of expressing a pattern of an operation status of a web system (refer to Non Patent Literature 1). Further, there is a technique of expressing the order of how chronological data has changed (refer to Non Patent Literature 2).

CITATION LIST

Non Patent Literature

Non Patent Literature 1: Hidetaka Koya, Makoto Komiyama, Hajime Nakajima, Akira Kataoka, and Takeshi Masuda, "Suggestion and Evaluation of Setting Method by End User for User Interface Extension", IEICE Technical Journal, ICM2019-4(2019-05), pp. 59-64

Non Patent Literature 2: Joao Rodrigues, Duarte Folgado, David Belo, Hugo Gamboa, "SSTS: A syntactic tool for pattern search on time series", Information Processing and Management 56 (2019), pp. 61-76

SUMMARY OF INVENTION

Technical Problem

However, in the related techniques, it is difficult to express an operation pattern by uniformly using a state and an order. That is, in the related techniques, expression of a state and expression of an order are independent from each other. For example, according to the technique described in Non Patent Literature 1, only a specific state can be expressed, and expression such as a case in which B is satisfied after A cannot be expressed. In addition, according to the technique described in Non Patent Literature 2, in a case in which A, B, and C have been input to the system screen, it is not possible to distinguish and express a case in which the input order of A, B, and C is irrelevant and a case in which the input order is important. Therefore, it is not possible to express a pattern including both a state and an order such as "in a situation in which a certain state is satisfied, the state has changed in the corresponding order". Therefore, in the related techniques, it is not possible to determine whether or not a situation of "an operation is performed in a certain order in a state in which a certain state is satisfied" matches the operation pattern.

The present invention has been made in view of the above, and an object of the present invention is to express an operation pattern by uniformly using a state and an order.

Solution to Problem

In order to solve the above-described problems and achieve the object, an extraction device includes: processing circuitry configured to: create an operation pattern using a state of an operation result and an order of the state; acquire an operation log; and extract the operation pattern included in the acquired operation log.

Advantageous Effects of Invention

According to the present invention, it is possible to express an operation pattern by uniformly using a state and an order.

BRIEF DESCRIPTION OF DRAWINGS

FIG. 10 is a diagram for describing processing of the extraction unit.

FIG. 11 is a diagram for describing processing of the extraction unit.

DESCRIPTION OF EMBODIMENTS

Figure 1:
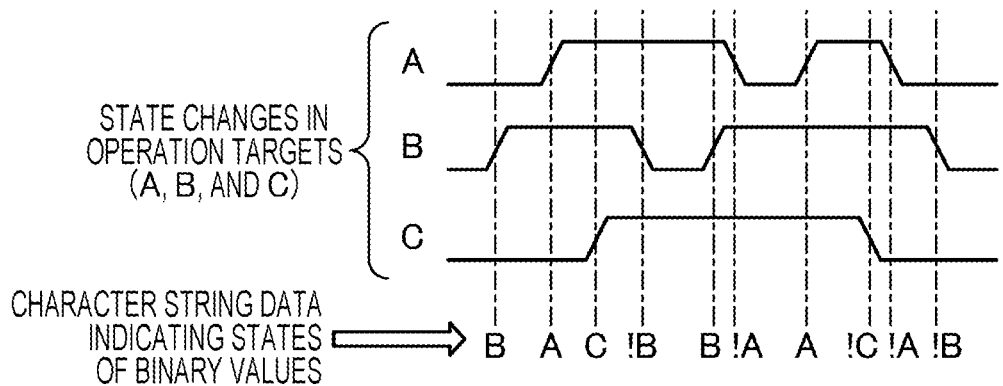
FIG. 1 is a diagram for describing an overview of an extraction device of the present embodiment.

Hereinafter, an embodiment of the present invention will be described in detail with reference to the drawings. Note that the present invention is not limited by this embodiment. In the drawings, the same parts are denoted by the same reference numerals.

[Overview of Extraction Device] FIG. 1 is a diagram for describing an overview of an extraction device of the present embodiment. For example, the extraction device according to the present embodiment determines whether or not an operation pattern input by an analyst is included in an operation log in which a user operates an application. As illustrated in FIG. 1, the extraction device expresses an operation pattern by uniformly using a state and an order.

Specifically, first, the extraction device expresses a state of an actual operation result such as "execution button is displayed" by a binary value of ON (satisfied)/OFF (not satisfied). Then, as illustrated at point (1), the extraction device encodes the status of the actual operation result such as the operation log into character string data of a series of binary states. For example, a state such as "execution button is displayed" is expressed by a binary value of ON (satisfied)/OFF (not satisfied). Point (1) illustrates a time-series change in a state expressed by a binary value of ON (satisfied)/OFF (not satisfied) for each of three states A, B, and C. Further, at a timing at which any of the three states changes, the change in the state is encoded into character string data expressing a series of states by being expressed by a character such as "B", "!B", or the like. Here, "B" is expressed in a case in which the state B changes from OFF to ON, and "!B" is expressed in a case in which the state B changes from ON to OFF.

Next, as illustrated at point (2), the extraction device expands a regular expression for expressing a plurality of character strings in one format by introducing an operand {{<logical formula>}} to uniformly express a state and an order of an operation log. In the present embodiment, an order is expressed using the regular expression. Further, a logical formula is described between operands "{{" and "}}" to express a state. At point (2), for example, an operation pattern of "C is finally operated in a state in which A and B are satisfied" is expressed as "{{A&B}}.*C$".

As described above, the extraction device determines, for example, whether or not there is a matching operation status in accumulated operation logs offline using an operation pattern represented by the introduced operand {{<logical formula>}}. In the case of such offline processing, the speed can be increased by converting the logical formula into the efficient regular expression.

In addition, it is also possible to determine online whether or not an operation pattern matches the current operation status. In the case of such online processing, the speed can be increased by caching a state.

Figure 2:
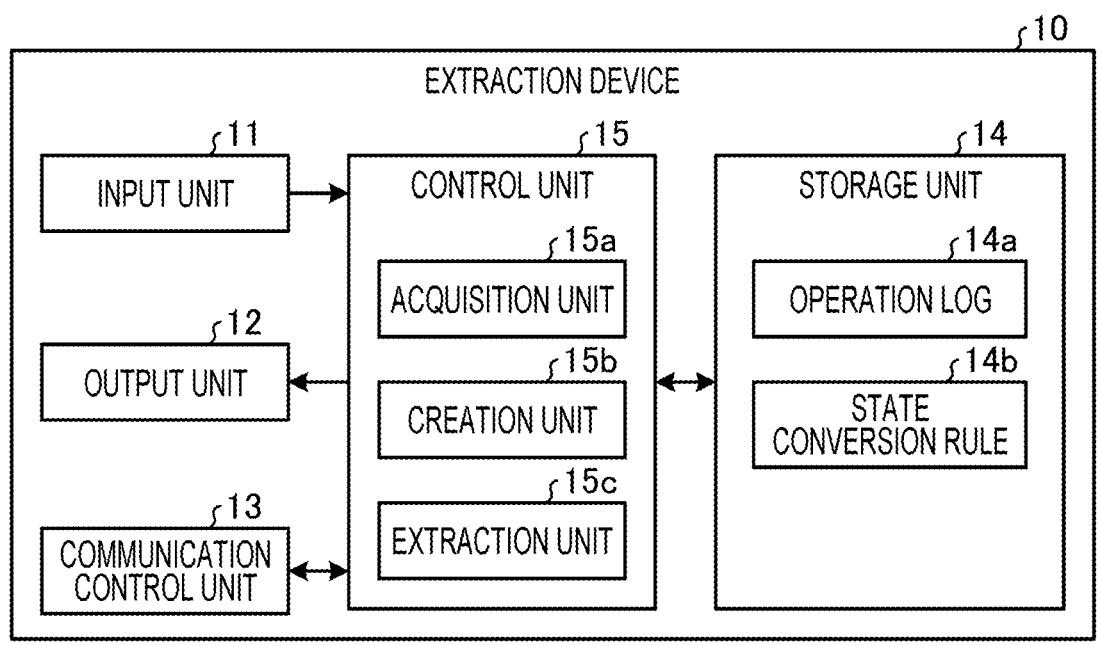
FIG. 2 is a schematic diagram illustrating a schematic configuration of the extraction device of the present embodiment.

[Configuration of Extraction Device] FIG. 2 is a schematic diagram illustrating a schematic configuration of the extraction device of the present embodiment. As illustrated in FIG. 2, the extraction device 10 of the present embodiment is realized by a general-purpose computer such as a personal computer, and includes an input unit 11, an output unit 12, a communication control unit 13, a storage unit 14, and a control unit 15.

The input unit 11 is realized by using an input device such as a keyboard, a mouse, or a microphone, and inputs various types of instruction information such as processing start to the control unit 15 in response to an input operation performed by an operator. The output unit 12 is realized by a display device such as a liquid crystal display, a printing device such as a printer, or the like.

The communication control unit 13 is realized by a network interface card (NIC) or the like, and controls communication between an external device and the control unit 15 via an electric communication line such as a local area network (LAN) or the Internet. For example, the communication control unit 13 controls communication between the control unit 15 and a terminal operated by a user, a terminal operated by a user which outputs an operation log that is a target of extraction processing which will be described later, a management device that manages an operation log of a user, or the like.

The storage unit 14 is realized by a semiconductor memory element such as a random access memory (RAN) or a flash memory, or a storage device such as a hard disk or an optical disk. In the storage unit 14, a processing program for operating the extraction device 10, data used during execution of the processing program, and the like are stored in advance, or temporarily stored each time processing is performed. Note that the storage unit 14 may be configured to communicate with the control unit 15 via the communication control unit 13.

In the present embodiment, the storage unit 14 stores, for example, an operation log 14a that is a target of extraction processing which will be described later, a state conversion rule 14b used for the extraction processing, and the like. For example, the acquisition unit 15a which will be described later acquires the operation log 14a from the terminal operated by the user prior to the extraction processing, and accumulates the operation log in the storage unit 14.

Figure 3:
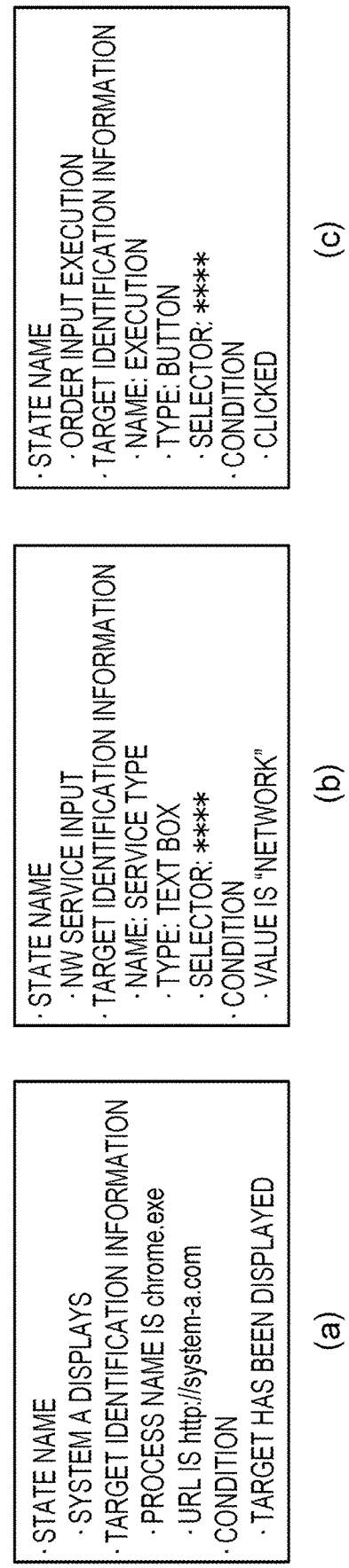
FIG. 3 is a diagram for describing a state conversion rule.

FIG. 3 is a diagram for describing the state conversion rule. The state conversion rule 14b is a rule for converting a state of an operation result illustrated in FIG. 3 into a binary value of ON (satisfied)/OFF (not satisfied). In the example illustrated in FIG. 3, a state of an operation result is defined such that it can be expressed by a binary value by being defined by a state name, target identification information, and a state change condition.

For example, in FIG. 3(b), a state is defined by a state name "NW service input", target identification information "name: service type, type: text box, selector: ****", and a state change condition "value is "network"", and the state can be identified by a binary value of ON/OFF of the condition. Note that the selector is information for identifying an object on a system screen or a desktop. For example, it includes jQuery selector notation for identifying an object on a web browser, information held by AutomationElement by UI Automation for identifying an object like Windows (registered trademark) application, and the like.

The description returns to FIG. 2. The control unit 15 is realized by using a central processing unit (CPU) or the like, and executes a processing program stored in a memory. As a result, as illustrated in FIG. 2, the control unit 15 functions as an acquisition unit 15a, a creation unit 15b, and an extraction unit 15c. Note that these functional units or some thereof may be implemented in different pieces of hardware. For example, the acquisition unit 15a may be implemented in hardware different from other functional units. Furthermore, the control unit 15 may include other functional units.

The acquisition unit 15a acquires an operation log. For example, the acquisition unit 15a acquires an operation log that is a target of extraction processing which will be described later from a terminal operated by the user or from a management device or the like that manages operation logs via the input unit 11 or the communication control unit 13. The acquisition unit 15a stores the acquired operation log in the storage unit 14. Alternatively, the acquisition unit 15a may transfer the acquired operation log to the creation unit 15b which will be described later online.

The creation unit 15*b* creates an operation pattern using a state of an operation result and the order of the state. Specifically, the creation unit 15*b* creates an operation pattern using character string data that is a series of states represented as binary values.

Figure 4:
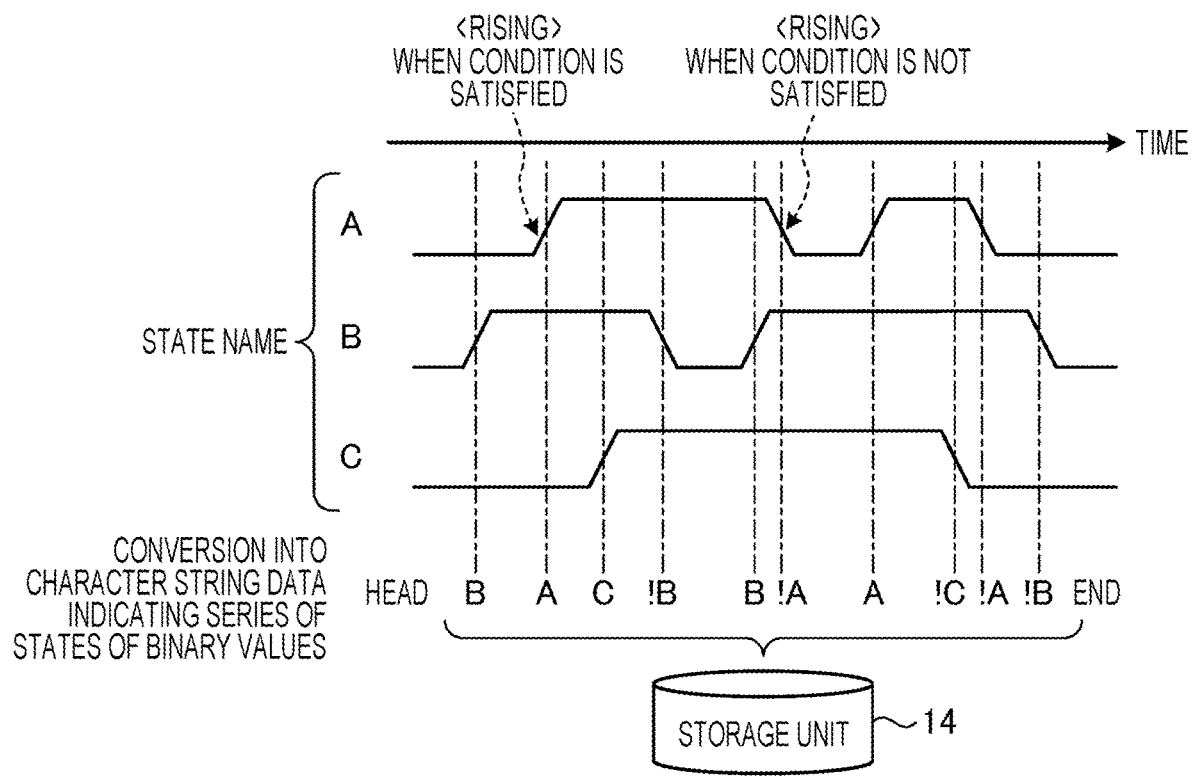
FIG. 4 is a diagram for describing processing of a creation unit.

Here, FIG. 4 to FIG. 8 are diagrams for describing processing of the creation unit. As illustrated in FIG. 4, the creation unit 15*b* converts a state of an actual operation result such as an operation log into a state that can be expressed by a binary value using the state conversion rule 14*b*, and creates an operation pattern in a series of states.

In the example illustrated in FIG. 4, similarly to the example illustrated in FIG. 1, time-series changes of states represented by binary values of ON (satisfied)/OFF (not satisfied) are illustrated for each of the three states A, B, and C. Furthermore, at a timing at which any of the three states changes, for example, in a case in which the state B changes from OFF to ON, the change is represented by a character such as "B", and in a case in which the state B changes from ON to OFF, the change is represented by a character such as "!B". As a result, a change in a state of an operation result and the order thereof are encoded into character string data.

For example, the creation unit 15*b* encodes the operation log 14*a* acquired by the acquisition unit 15*a* into character string data as illustrated in FIG. 4 and stores the character string data in the storage unit 14.

In addition, the creation unit 15*b* creates and receives a state of an input predetermined operation result and the order of the state as an operation pattern. For example, the creation unit 15*b* creates and receives, as an operation pattern, a condition for a change in the status of an operation designated by an analyst via a UI.

Specifically, in a case in which the analyst designates the state of the operation result and the order of the state via the UI, for example, the creation unit 15*b* creates the operation pattern with a regular expression extended using the operand {{<logical formula>}} and receives the operation pattern as an extraction condition in extraction processing.

Figure 5:
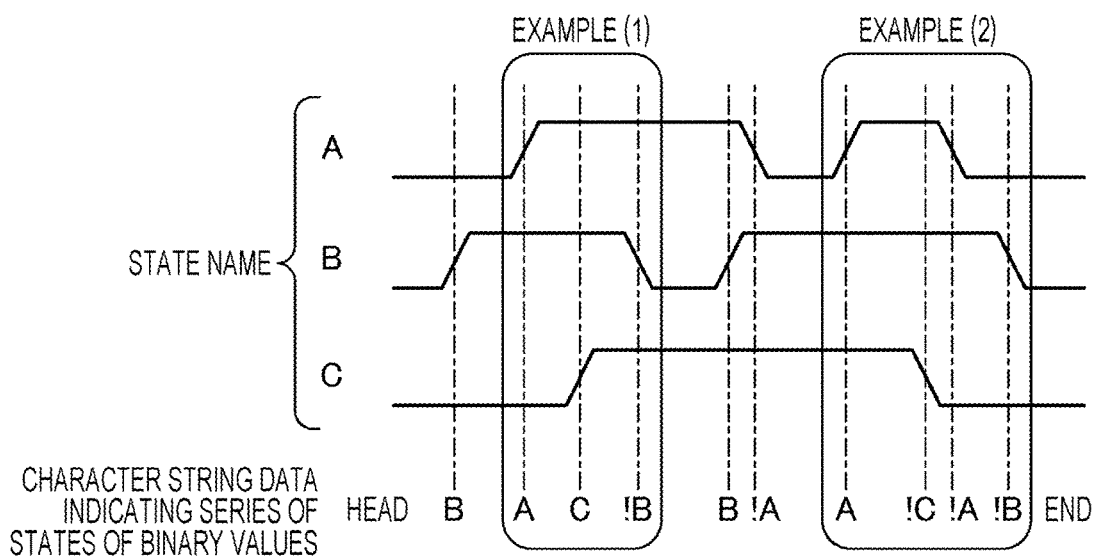
FIG. 5 is a diagram for describing processing of the creation unit.

Here, as illustrated in FIG. 5, the order of a designated operation can be represented by character string data. In the example (1) of FIG. 5, the order of an operation of "the state of C is satisfied immediately after the state of A is satisfied, and the state of B is not satisfied immediately thereafter" is illustrated. This order is encoded into character string data as described above and expressed as "AC!B".

Further, in the example (2) of FIG. 5, the order of an operation of "after the state of A is satisfied, processing finally ends without satisfying the state of B" is illustrated. This order is expressed as "A.*!B$".

Figure 6:
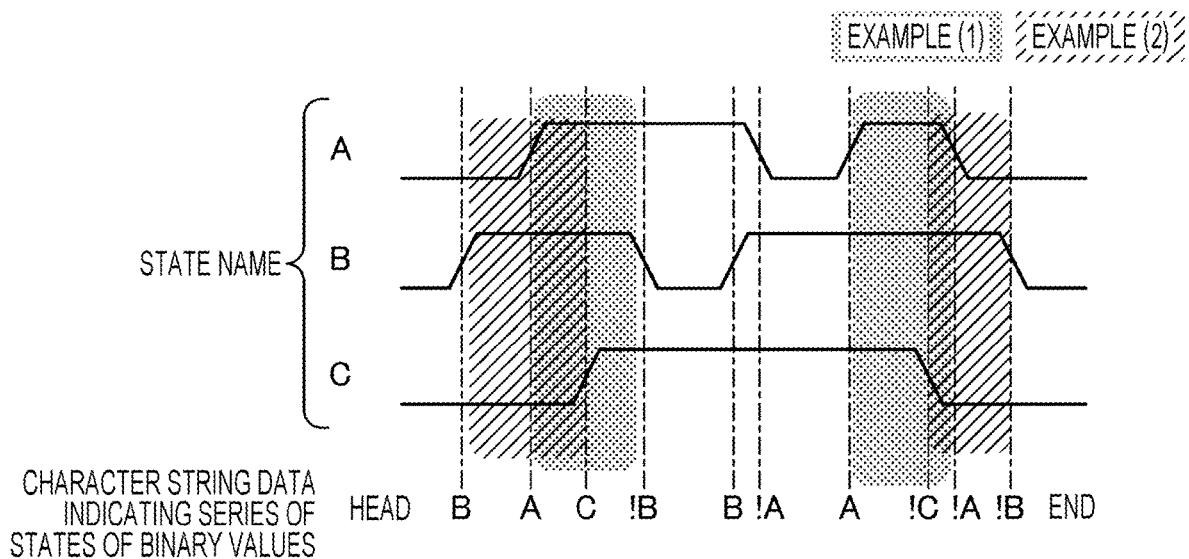
FIG. 6 is a diagram for describing processing of the creation unit.

Further, as illustrated in FIG. 6, the state of a designated operation can be expressed by character string data using a logical formula. In (1) of FIG. 6, a state of "both the states of A and B are satisfied" is expressed as "{{A&B}}". Further, in (2) of FIG. 6, a state of "the state of A or B is satisfied, and the state of C is not satisfied" is expressed as "{{(A|B)&!C}}".

Figure 7:
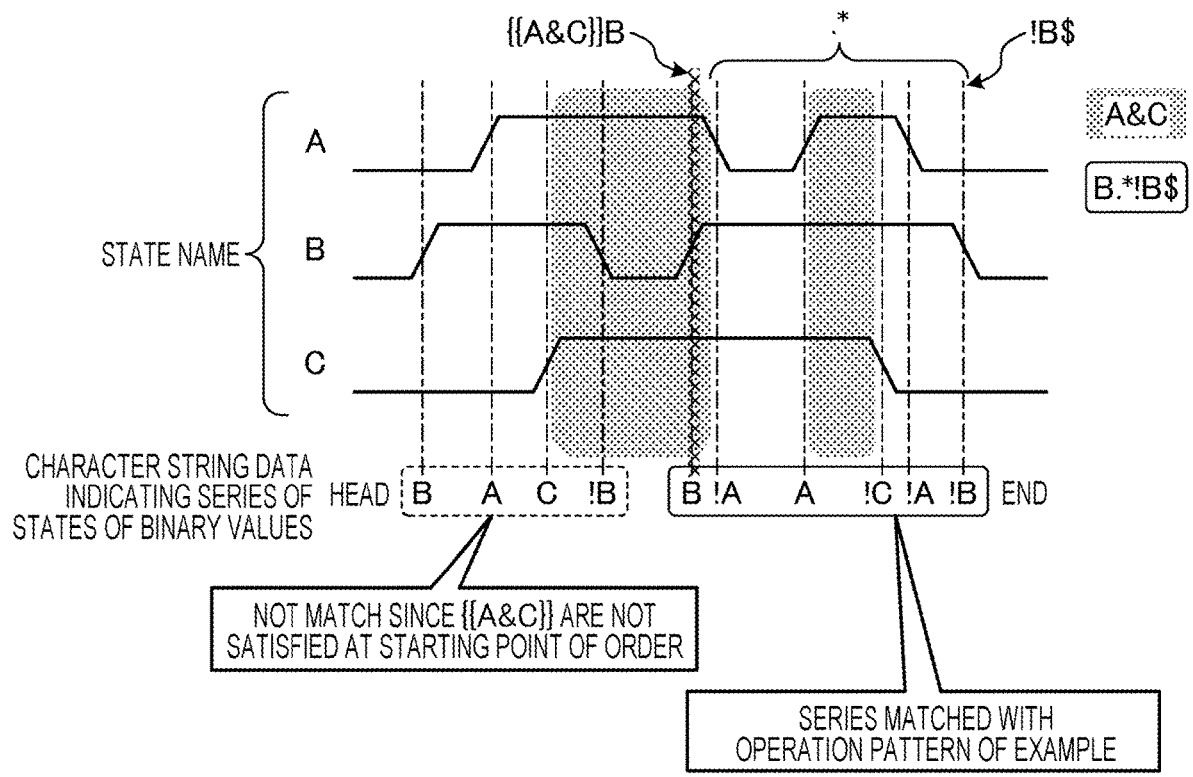
FIG. 7 is a diagram for describing processing of the creation unit.

Then, as illustrated in FIG. 7, the state and order of the designated operation can be expressed by a regular expression extended by a logical formula. In FIG. 7, a situation that "the state of B is satisfied in a situation in which the states of A&C are satisfied, and then the state remains in a state in which the state of B is not satisfied" is expressed as "{{A&C}}B.*!B$".

Figure 8:
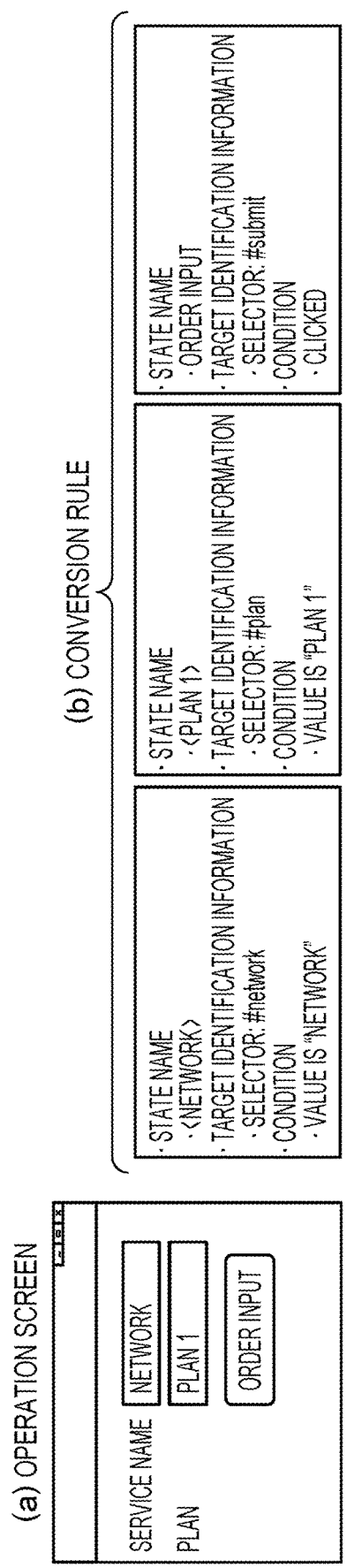
FIG. 8 is a diagram for describing processing of the creation unit.

Then, as illustrated in FIG. 8(*b*), the creation unit 15*b* can express a state by a binary value of ON (satisfied)/OFF (not satisfied) by setting and using the state conversion rule 14*b*. In the example illustrated in FIG. 8(*a*), for example, an operation pattern of "order input is performed in a state in which a network and plan 1 have been set" can be expressed as "{{<Network>&< Plan 1>}}.*<Order Input>".

Further, an operation pattern of "plan 1 is set immediately after the network has been set, and order input has been performed immediately thereafter" can be expressed as "<Network><Plan 1><Order Input>".

An operation pattern of "currently ended up with the network and plan 1 set" can be expressed as "{{<Network>&<Plan 1>}}$".

In this manner, the creation unit 15*b* creates an operation pattern using character string data that is a series of states represented by binary values.

The description returns to FIG. 2. The extraction unit 15*c* extracts an operation pattern included in the acquired operation log 14*a*. For example, it is determined whether or not the operation pattern received by the creation unit 15*b* is included in the acquired operation log 14*a*.

Figure 9:
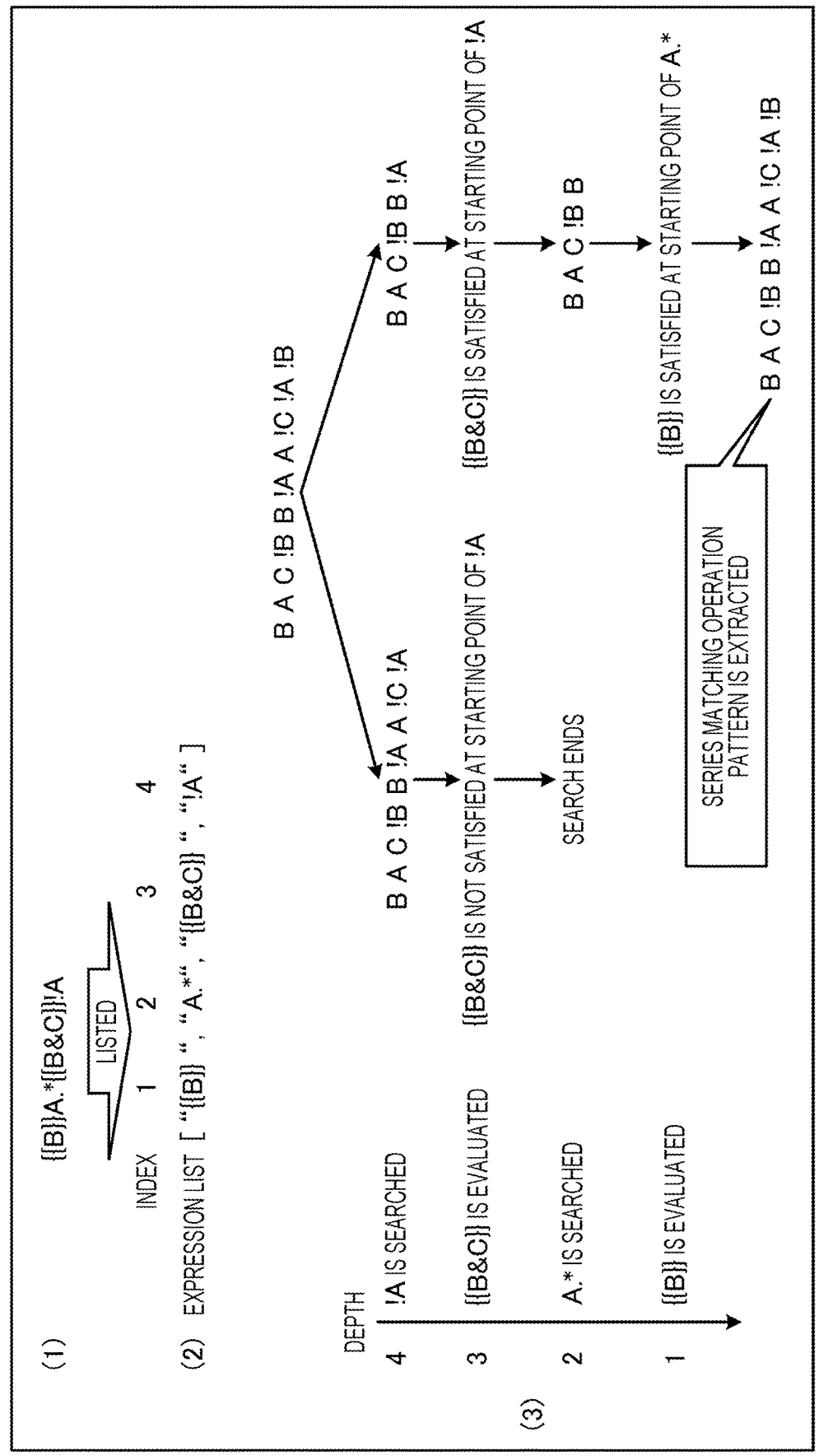
FIG. 9 is a diagram for describing processing of the extraction unit.

Here, FIG. 9 to FIG. 12 are diagrams for describing processing of the extraction unit. FIG. 9 illustrates a case in which the extraction unit 15*c* determines whether or not an operation pattern illustrated in FIG. 9(1) is included for an operation status expressed by character string data "BAC!B-B!AA!C!A!B" indicating a binary state.

In this case, as illustrated in FIG. 9(2), the extraction unit 15*c* divides the operation pattern into an expression of order and an expression of state, and generates an expression list in which each expression of the operation pattern is listed. In this case, an index assigned in chronological order of operation time is set as a variable "depth". Then, as illustrated in FIG. 9(3), the extraction unit 15*c* searches for a part matching the expression of an order or a state in descending order of the value of the variable "depth" (from newest to oldest). As a result, the operation pattern is extracted from the operation status.

In searching for the expression of order, a location in a character string indicating the encoded binary state where the corresponding order is present is searched using pattern matching of the regular expression. In the example of FIG. 9(3), "!A" is searched first. In this case, since there is a portion matching two locations of "!A", the character string is decomposed into partial character strings having the two locations as the ends of the partial character strings from the head of the character string, and processing branches into two for the partial character strings.

Next, it is evaluated whether "{{B&C}}" which is an expression of a state is satisfied for the previous partial character string. In the example of FIG. 9(3), in the branch of the partial character string "BAC!BB!AA!C!A", FALSE is determined in processing of determining the expression of the state which will be described later, and since the condition is not satisfied, the operation pattern does not match, and processing ends. In the branch of the partial character string "BAC!BB!A", TRUE is determined, and the procedure proceeds to search for the expression "A" in the next order.

In the search for the expression "A" in the next order, processing similar to that described above is recursively executed for the partial character string "BAC!BB!A", a partial character string "B" having one portion matching "A" as the end is further extracted since the portion is found first, it is evaluated whether or not an expression "{{B}}" of the next state is satisfied for the partial character string "B", TRUE is determined in this case, and processing ends since search and evaluation of all expressions are completed.

Accordingly, since the entire "{{B}}A.*{{B&C}}!A" given as an operation pattern is satisfied, the operation pattern "{{B}}A.*{{B&C}}!A" is successfully extracted for the character string data "BAC!BB!AA!C!A!B" indicating the given binary states, and "BAC!BB!A" is obtained as the extraction location.

In determination of the expression of a state, it is determined whether the logical formula expressing the state is True or False. For example, the extraction unit 15c determines whether or not a state {{A&B&C}} is satisfied at the point in time D at the end with respect to a character string data illustrated in FIG. 10(1). In this case, as illustrated in FIG. 10(2), all patterns may be listed. Here, "A(?!.*\!A)" expresses that A followed by any series, but !A does not occur.

In this case, if even one of the listed six patterns of regular expressions matches the series on the left side of D, the state {{A&B&C}} is satisfied. However, in this method, it is necessary to search for the factorial number of patterns of the number N (in this case, three of A, B, and C) of states used in expressions of states.

On the other hand, the extraction unit 15c may generate one regular expression for each state and hold a matching result (True/False). For example, as illustrated in FIG. 11(2), the extraction unit 15c determines three patterns for the series on the left side of D with respect to character string data illustrated in FIG. 11(1), and holds a matching result of each pattern. Then, as illustrated in FIG. 11(3), the matching results are finally reflected in the logical formula and determined.

In this case, search of N(=3) patterns of the number of states and one Boolean operation (set operation) are sufficient, and thus the extraction processing can be performed at a high speed.

Note that the acquisition unit 15a is not limited to a case of acquiring the operation log 14a offline as described above, and may acquire the operation log online. In the case of online, states are sequentially added to a series with time instead of all character string data that is a series of binary states being provided in advance.

Figure 12:
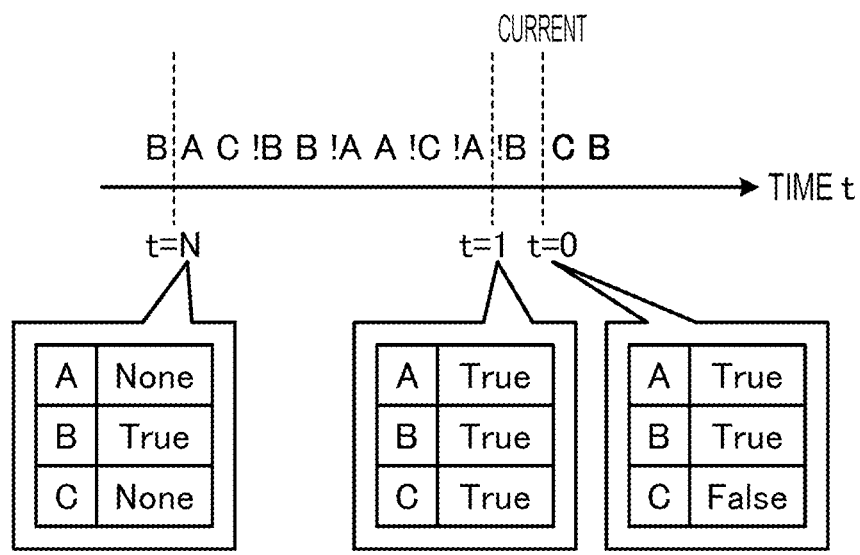
FIG. 12 is a diagram for describing processing of the extraction unit.

In that case, as illustrated in FIG. 12, the extraction unit 15c holds the states at all the times t, and when it becomes necessary to determine the state at a time t, performs determination using the held states. This makes it possible to perform determination at a high speed without requiring pattern matching or the like of the regular expression.

Figure 13:
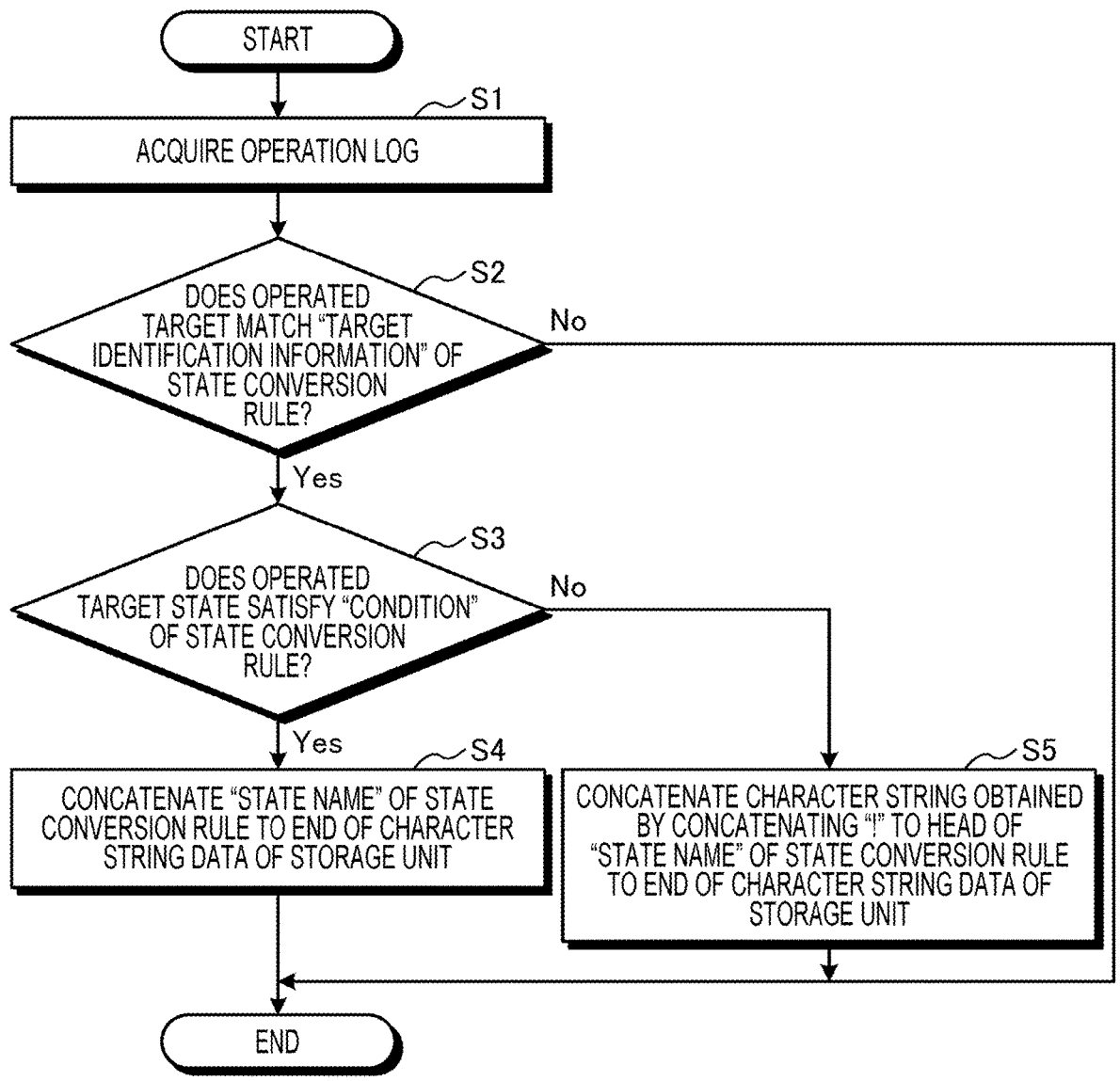
FIG. 13 is a flowchart illustrating an extraction processing procedure.
Figure 14:
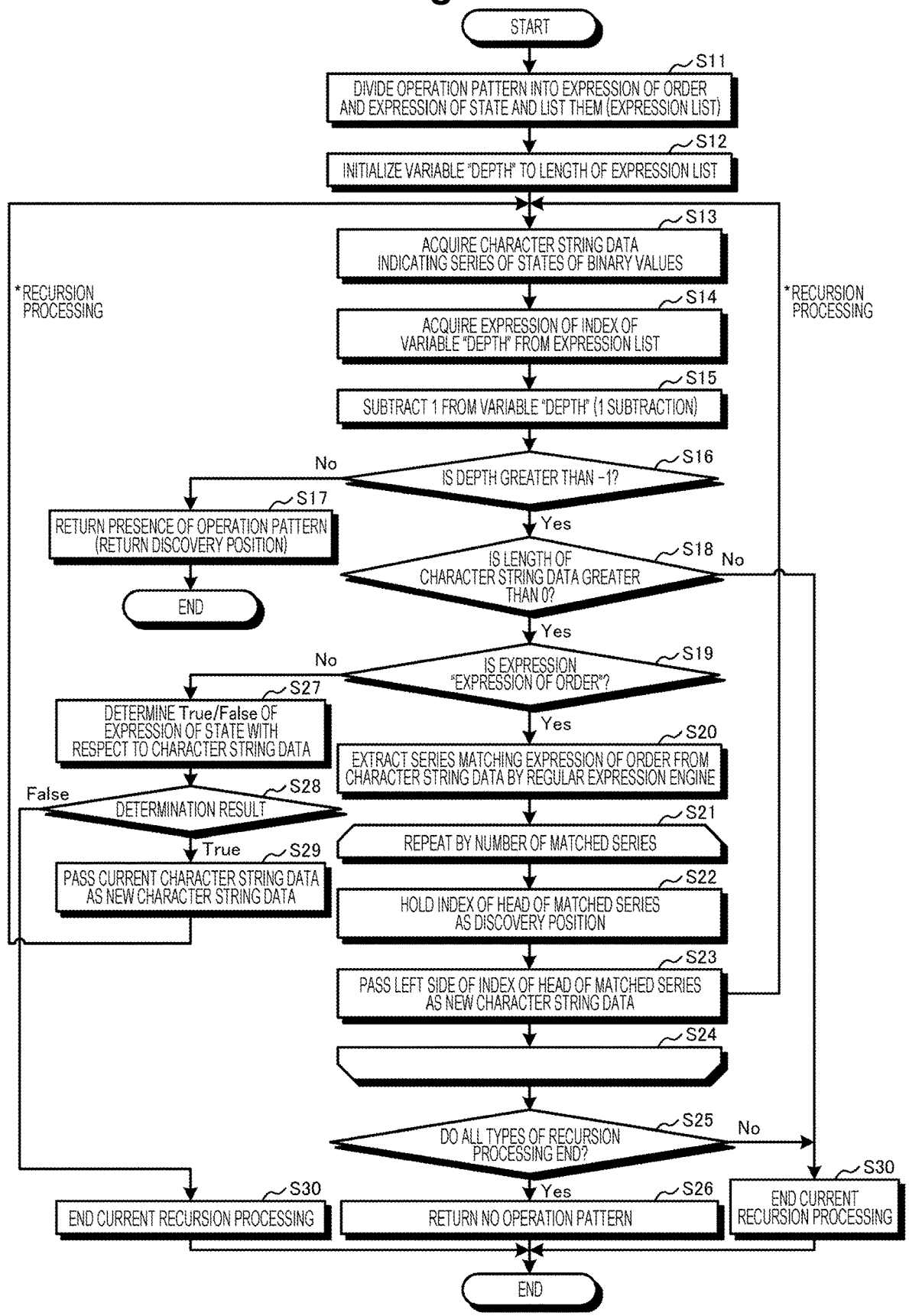
FIG. 14 is a flowchart illustrating the extraction processing procedure.

[Extraction Processing] Next, extraction processing by the extraction device 10 according to the present embodiment will be described with reference to FIG. 13 and FIG. 14. FIG. 13 and FIG. 14 are flowcharts illustrating an extraction processing procedure. FIG. 13 illustrates a procedure for converting an operation log that is an extraction processing target into character string data that is a series of binary states in order to enable extraction using a separately created operation pattern.

Note that, in creating the operation pattern, for example, the operation pattern is converted into character string data that is a series of binary states by a state conversion rule designated by an analyst using a UI or the like, and the operation pattern is created by uniformly using a state name defined by the corresponding state conversion rule according to a regular expression and a logical formula.

The flowchart of FIG. 13 is started, for example, at a timing when the analyst gives an instruction to start processing. First, the acquisition unit 15a acquires an operation log (step S1).

Next, the creation unit 15b checks whether or not an operated target matches "target identification information" of the state conversion rule 14b with reference to the state conversion rule 14b (step S2). In a case in which they do not match (No in step S2), the series of processing ends. On the other hand, in a case in which they match (Yes in step S2), it is checked whether the operated target satisfies "condition" of the state conversion rule 14b (step S3).

In a case in which the operated target satisfies the "condition" (Yes in step S3), "state name" of the state conversion rule 14b is concatenated to the end of the character string data and stored in the storage unit 14 (step S4), and the series of processing ends.

Further, in a case in which the operated target does not satisfy the "condition" (No in step S3), a character string obtained by concatenating "!" to the head of the "state name" of the state conversion rule 14b is concatenated to the end of the character string data and stored in the storage unit 14 (step S5), and the series of processing ends.

Next, FIG. 14 illustrates a procedure for extracting an operation pattern from an operation log that is an extraction processing target. The flowchart of FIG. 14 is started, for example, at a timing when the analyst gives an instruction to start processing. First, the extraction unit 15c divides the operation pattern into an expression of order and an expression of state, and generates an expression list in which each state of the operation pattern is listed (step S11). Further, the extraction unit 15c initializes the variable "depth" to the length of the expression list (step S12).

Then, the extraction unit 15c acquires character string data obtained by converting the operation log that is a processing target into a series of binary states from the creation unit 15b (step S13). In addition, the extraction unit 15c acquires indexes assigned to the expression list in chronological order of operation time as the variable "depth" (step S14). In addition, 1 is subtracted from the acquired value of the variable "depth" (step S15). Then, in a case in which the value of the variable "depth" is −1 or less (No in step S16), "presence of operation pattern" and the discovery position are returned (step S17). In this manner, the series of processing ends.

On the other hand, in a case in which the value of the variable "depth" is greater than −1 (Yes in step S16), the extraction unit 15c checks whether or not the length of the character string data is greater than 0 (step S18). In a case in which the length of the character string data is 0 or less (No in step S18), current recursion processing ends (step S30). In this manner, the series of processing ends.

On the other hand, in a case in which the length of the character string data is greater than 0 (Yes in step S18), the extraction unit 15c extracts a matching series from the character string data by a regular expression engine for the expression of order (Yes in step S19) (step S20). Then, the extraction unit 15c repeats the processing of steps S22 and S23 by the number of matched series (steps S21 and S24). That is, in processing of step S22, the index of the head of the matched series is stored as a discovery position. Further, in processing of step S23, the left side from the index of the head of the matched series is passed as new character string data.

In a case in which all types of recursion processing do not end (No in step S25), the extraction unit 15c ends the current recursion processing (step S30). Then, in a case in which all types of recursion processing end (Yes in step S25), the extraction unit 15c returns "no operation pattern" (step S26). In this manner, the series of processing ends.

Meanwhile, regarding the expression of state (No in step S19), the extraction unit 15c determines whether the logical formula of the expression of state is True or False with respect to the character string data (step S27). In a case in which the determination result is True (True in step S28), the current character string data is passed as new character string data (step S29), and processing returns to step S13. On the other hand, in a case in which the determination result is False (False in step S28), the current recursion processing ends (step S30). In this manner, the series of processing ends.

[Effects] As described above, in the extraction device 10 of the present embodiment, the acquisition unit 15a acquires the operation log 14a. The creation unit 15b creates an operation pattern using a state of an operation result and the order of the state. The extraction unit 15c extracts an operation pattern included in the acquired operation log 14a.

As a result, the extraction device 10 can express the operation pattern by uniformly using the state and the order. In addition, it is possible to easily determine whether or not the operation pattern matches a status.

Therefore, in a case in which an operation log is analyzed on the basis of the experience of a user, for example, it is possible to analyze the operation log more flexibly using an operation pattern as a query. Alternatively, in a case in which an application that determines the current operation status of a system operator and causes an action is realized, it is possible to express a more flexible operation pattern and perform determination in real time. Therefore, it is possible to easily perform various applications such as preventing erroneous transmission by determining "whether a certain state has been satisfied when a mail transmission button is pressed" in real time, for example.

As described above, in a case in which it is desired to perform determination based on the state and order of an operation log, such as a case in which a specific operation has been performed from the state of a certain system screen, analysis can be easily performed. In addition, it is possible for the user to perform search and analysis by expressing an operation pattern using experience such that the operation is performed after the operation has been performed or an operation log in which the operation has been performed is present after the state of the system screen.

In addition, the creation unit 15b creates an operation pattern using character string data that is a series of states expressed by binary values. As a result, it is possible to designate an operation pattern intended by an analyst.

In addition, the creation unit 15b creates and receives the state of an input predetermined operation result and the order of the state as an operation pattern, and the extraction unit 15c determines whether or not the received operation pattern is included in the acquired operation log. As a result, it is possible to easily extract an operation pattern intended by an analyst.

[Program] It is also possible to create a program in which processing executed by the extraction device 10 according to the above embodiment is described in a computer executable language. As an embodiment, the extraction device 10 can be implemented by causing a desired computer to install an extraction program that executes the above-described extraction processing as package software or online software. For example, by causing an information processing device to execute the above-described extraction program, the information processing device can be caused to function as the extraction device 10. The information processing device mentioned here includes a desktop or notebook personal computer. In addition, examples of the information processing device include mobile communication terminals such as a smartphone, a mobile phone, and a personal handyphone system (PHS), and slate terminals such as a personal digital assistant (PDA). Further, the function of the extraction device 10 may be implemented in a cloud server.

Figure 15:
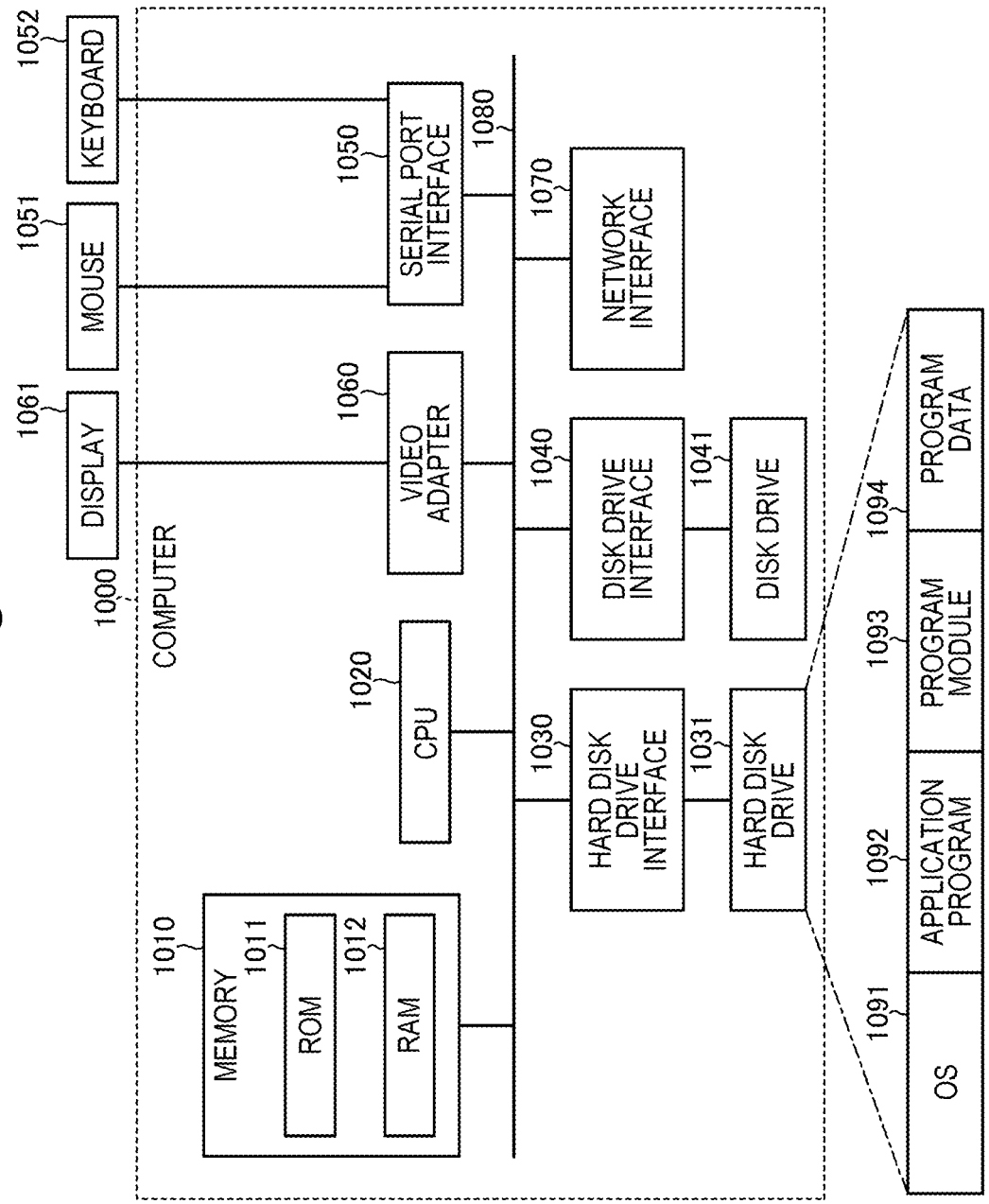
FIG. 15 is a diagram illustrating an example of a computer that executes an extraction program.

FIG. 15 is a diagram illustrating an example of a computer that executes the extraction program. The computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to the hard disk drive 1031. The disk drive interface 1040 is connected to the disk drive 1041. For example, a removable storage medium such as a magnetic disk or an optical disk is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. Each piece of information described in the above embodiment is stored in, for example, the hard disk drive 1031 or the memory 1010.

In addition, the extraction program is stored in the hard disk drive 1031 as the program module 1093 in which a command to be executed by the computer 1000 is described, for example. Specifically, the program module 1093 in which each type of processing executed by the extraction device 10 described in the above embodiment is described is stored in the hard disk drive 1031.

In addition, data used for information processing by the extraction program is stored, for example, in the hard disk drive 1031 as the program data 1094. Then, the CPU 1020 reads the program module 1093 and the program data 1094 stored in the hard disk drive 1031 to the RAM 1012 as necessary, and executes each procedure described above.

Note that the program module 1093 and the program data 1094 related to the extraction program are not limited to being stored in the hard disk drive 1031, and may be stored in, for example, a removable storage medium and read by the CPU 1020 via the disk drive 1041 or the like. Alternatively, the program module 1093 and the program data 1094 related to the extraction program may be stored in another computer connected via a network such as a LAN or a wide area network (WAN) and read by the CPU 1020 via the network interface 1070.

Although the embodiments to which the invention made by the present inventors is applied have been described above, the present invention is not limited by the description and drawings constituting a part of the disclosure of the present invention according to the present embodiments. In other words, other embodiments, examples, operational technologies, and the like made by those skilled in the art or the like on the basis of the embodiment are all included in the scope of the present invention.

REFERENCE SIGNS LIST

10 Extraction device
11 Input unit
12 Output unit
13 Communication control unit
14 Storage unit
14a Operation log
14b State conversion rule
15 Control unit 15*a* Acquisition unit
15*b* Creation unit
15*c* Extraction unit

The invention claimed is:

1. An extraction device comprising:
processing circuitry configured to:
receive, via a user interface, a condition for a change in a status of an operation;
create an operation pattern using a series of first states of an operation result and an order of the series of first states using the received condition for the change in the status of the operation;
generate an expression list that comprises each first state of the series of first states by dividing the operation pattern;
create and receive a state of an input predetermined operation result an order of the state as the operation pattern;
acquire an operation log;
convert data of the operation log into a series of second states;
determine whether or not the received state of the input predetermined operation result is included in the acquired operation log; and
for each first state of the series of first states from the generated expression list:
determine whether the first state matches to a second state of the series of second states;
in response to determining a match exists, extract the second state that matches to the first state included in the acquired operation log, wherein
the generating includes encoding the operation log into character string data, and converting a state of an actual operation result included in the operation log into a state that is expressed by a binary value using a state conversion rule.

2. The extraction device according to claim 1, wherein the processing circuitry is further configured to create the operation pattern using the character string data that is the first state of the series of the first states represented by binary values.

3. The extraction device according to claim 1, wherein each first state of the series of first states comprises the encoding of the character string data that represents a change of the first state.

4. The extraction device according to claim 1, wherein the processing circuitry is configured to determine whether the first state matches to the second state of the series of second states in a descending order of the generated expression list.

5. The extraction device according to claim 1, wherein the processing circuitry is configured to determine, using a regular expression processing, whether the first state matches to a second state of the series of second states.

6. An extraction method executed by an extraction device, the extraction method comprising:
receiving, via a user interface, a condition for a change in a status of an operation;
creating an operation pattern using a series of first states of an operation result and an order of the series of first states using the received condition for the change in the status of the operation;
generating an expression list that comprises each first state of the series of first states by dividing the operation pattern;
creating and receiving a state of an input predetermined operation result an order of the state as the operation pattern;
acquiring an operation log;
converting data of the operation log into a series of second states;
determining whether or not the received state of the input predetermined operation result is included in the acquired operation log; and
for each first state of the series of first states from the generated expression list:
determining whether the first state matches to a second state of the series of second states;
in response to determining whether a match exists, extracting the second state that matches to the first state included in the acquired operation log, wherein
the generating includes encoding the operation log into character string data, and converting a state of an actual operation result included in the operation log into a state that is expressed by a binary value using a state conversion rule.

7. A non-transitory computer-readable recording medium storing therein an extraction program that causes a computer to execute a process comprising:
receiving, via a user interface, a condition for a change in a status of an operation;
creating an operation pattern using a series of first states of an operation result and an order of the series of first states using the received condition for the change in the status of the operation;
generating an expression list that comprises each first state of the series of first states by dividing the operation pattern;
creating and receiving a state of an input predetermined operation result an order of the state as the operation pattern;
acquiring an operation log;
converting data of the operation log into a series of second states;
determining whether or not the received state of the input predetermined operation result is included in the acquired operation log; and
for each first state of the series of first states from the generated expression list:
determining whether the first state matches to a second state of the series of second states;
in response to determining whether a match exists, extracting the second state that matches to the first state included in the acquired operation log, wherein
the generating includes encoding the operation log into character string data, and converting a state of an actual operation result included in the operation log into a state that is expressed by a binary value using a state conversion rule.

* * * * *